(No Model.) 3 Sheets—Sheet 1.
J. C. HAZLETT.
INDICATING DEVICE FOR CASH REGISTERS AND INDICATORS.

No. 396,483. Patented Jan. 22, 1889.

Witnesses,
F. G. Fischer,
A. A. Higdon.

Inventor
J. C. Hazlett
By his Attorney J. C. Higdon (No Model.) 3 Sheets—Sheet 2.

J. C. HAZLETT.
INDICATING DEVICE FOR CASH REGISTERS AND INDICATORS.

No. 396,483. Patented Jan. 22, 1889.

Witnesses:
F. J. Fischer
A. A. Higdon

Inventor
J. C. Hazlett
By his Attorney
J. C. Higdon (No Model.) 3 Sheets—Sheet 3.
J. C. HAZLETT.
INDICATING DEVICE FOR CASH REGISTERS AND INDICATORS.
No. 396,483. Patented Jan. 22, 1889.
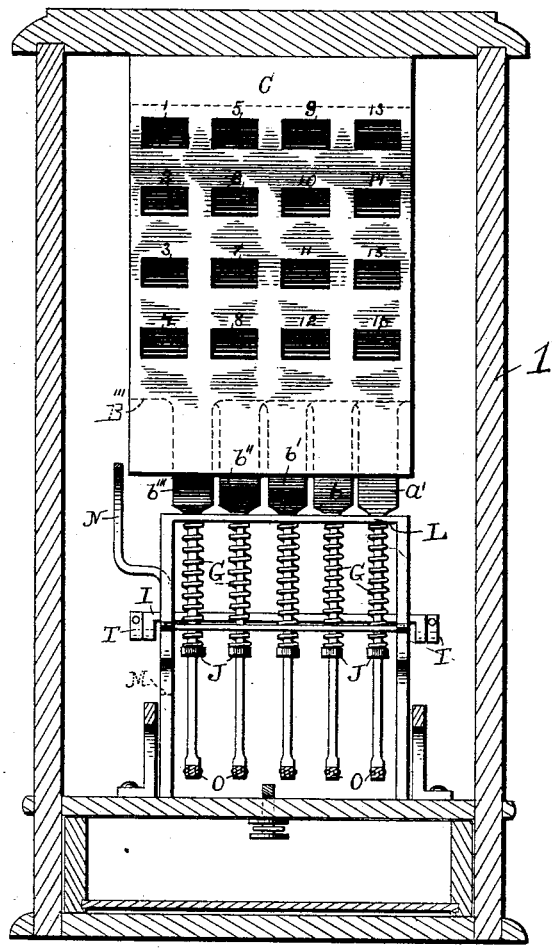
Fig. 5.
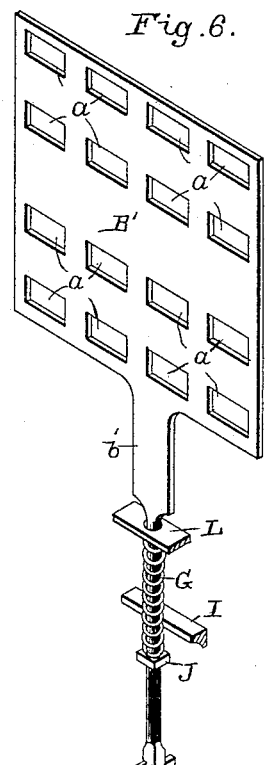
Fig. 6.
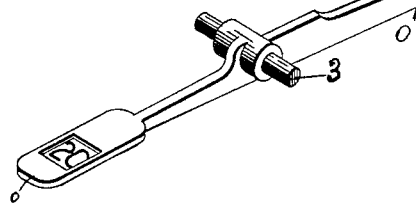
Witnesses,
F. G. Fischer,
A. A. Higdon.
Inventor,
J. C. Hazlett.
By his Attorney
J. C. Higdon

UNITED STATES PATENT OFFICE.

JOHN C. HAZLETT, OF MUSCATINE, IOWA.

INDICATING DEVICE FOR CASH REGISTERS AND INDICATORS.

SPECIFICATION forming part of Letters Patent No. 396,483, dated January 22, 1889.

Application filed October 4, 1888. Serial No. 287,245. (No model.)

*To all whom it may concern:*

Be it known that I, JOHN CLARK HAZLETT, of Muscatine, Muscatine county, Iowa, have invented certain new and useful Improvements in Indicating Devices for Cash-Registers, of which the following is a full, clear, and exact description, reference being had to the accompanying drawings, forming a part hereof.

This invention relates to that class of devices known as "cash-registers;" and it consists of certain arrangements of movable plates, whereby the amounts registered are displayed, and also in the mechanism for moving such plates.

Figure 1:
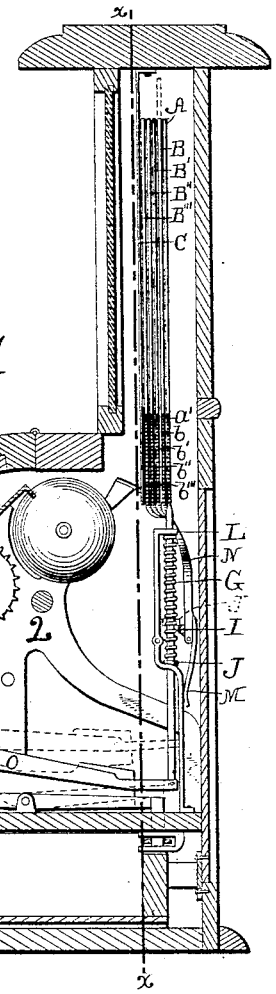
Figure 2:
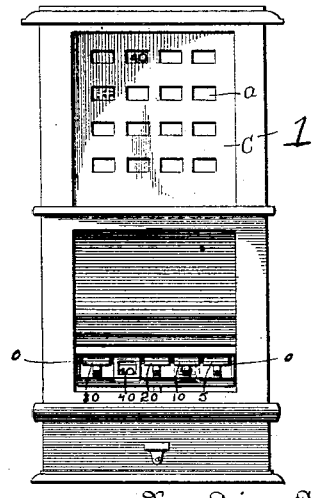
Figure 3:
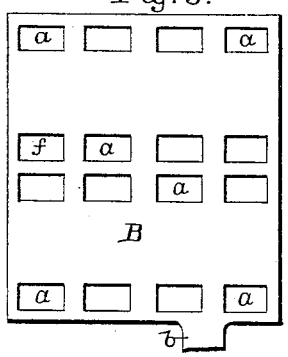
Figure 3:
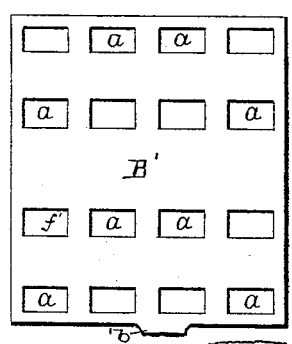
Figure 3:
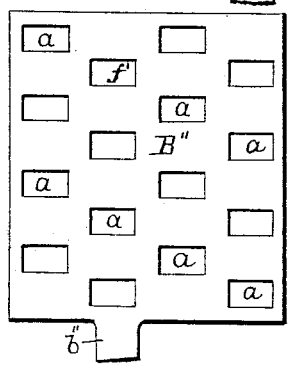
Figure 3:
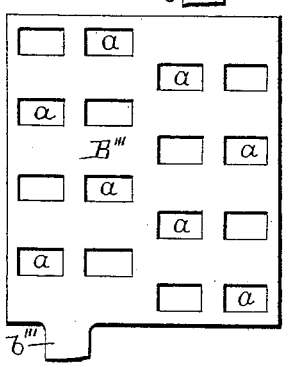
Figure 3:
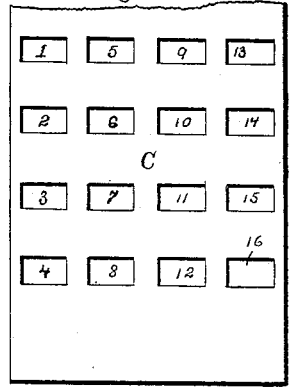
Figure 3:
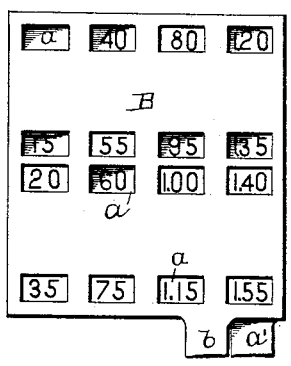
Figure 3:
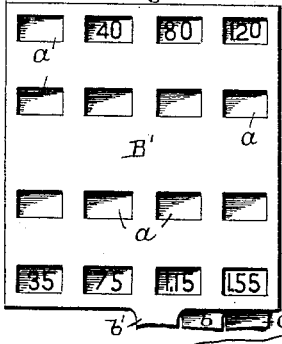
Figure 3:
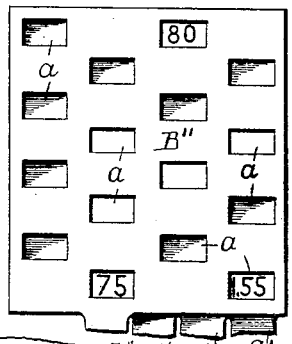
Figure 4:
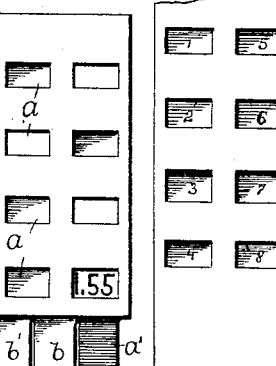
Figure 4:
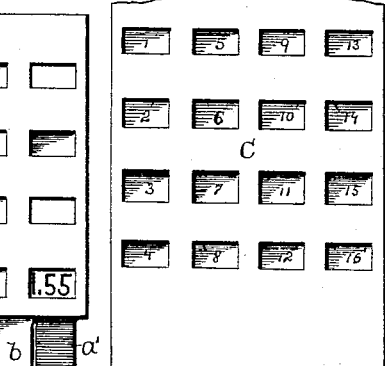

In the drawings, Figure 1 is a sectional elevation of the apparatus. Fig. 2 is a front view on a smaller scale. Fig. 3 illustrates in face view the various plates by which the amounts registered are displayed. Fig. 4 shows successively the same plates in their superposed or overlapping positions. Fig. 5 is a sectional view on the line $x\,x$, Fig. 1; and Fig. 6 is a detached perspective view of one of the plates and its operating-lever.

The operating mechanism is mounted within a casing, 1, which is of any desired or suitable shape, construction, and materials. The recording or adding and the alarm mechanisms are designated generally by the numeral 2, and may be of any suitable construction. Independently mounted upon a transverse shaft, 3, situated across the front of the casing, are a series of keys or levers, O, having at their forward exposed ends finger plates or disks $o$, upon which are certain numbers, as shown in Figs. 2 and 6. The form of apparatus which I have chosen to illustrate my invention is adapted to register all purchases varying in amount from five cents to one dollar and fifty-five cents, which are multiples of five. To secure this result, but five levers O are required, the first of the series having indicated on its finger-plate the number 5, the second the number 10, the third 20, the fourth 40, and the fifth 80, each lever after the first having upon it a number twice as large as that on the one preceding it.

In the upright portion of the casing there is mounted a plate, A, having on its face a series of numbers from 5 to 155, preferably arranged as shown in Fig. 3. One of these numbers is supposed to be exposed to view each time a purchase is made, in order to indicate to the purchaser the amount thereof and the fact that it has been registered, such exposure being accomplished by a person—as the cashier—pressing down upon one or more of the levers O.

In front of the plate A is arranged a series of exposing-plates, B, B', B'', and B''', perforated at $a$ in the manner shown in Fig. 3. Each of these plates A, B, B', B'', and B''' is connected with the inner end of one of the levers O by means of the arms shown at $a'$, $b$, $b'$, $b''$, and $b'''$, (see Figs. 1, 5, and 6,) so that when the outer end of a lever is depressed the plate connected therewith will be elevated, as indicated in dotted lines, Fig. 1.

The lower part of each arm connecting one of the said plates with its lever is made cylindrical, and has mounted thereon a coiled spring, G, arranged between a nut, J, and the cross-plate L of a guide in which the arms slide, and tending to return the plate and its carrying-lever to their normal positions.

I is a bar pivoted in the lugs T and arranged in rear of the arms $a'$ $b'$, &c., which arms are bent to all lie in the same plane in position to be struck by the nuts J when they are elevated. The under face of this bar is beveled, as shown in Fig. 6, so that the contact of a nut J therewith will cause it to turn on its pivots and allow the nut to pass above it, where it is locked in the position shown in dotted lines, Fig. 1, thus holding the plate in an elevated position until it is released by the bar I being again rocked by the depression of another lever, or otherwise.

The bar I has secured thereto the arm N of the bell-hammer, so that each time the bar is rocked a signal is given.

C is a stationary plate arranged in front of the movable plates hereinbefore referred to and having a series of sight-apertures, numbered 1 to 16, Figs. 3 and 4.

When a purchase is made, the salesman or cashier presses down upon such key or lever O as has designated thereon the amount of the purchase, or upon two or more levers the sum of the amounts on which equals the amount of the purchase. The relations of the apertures $a$ in the plates, including the stationary one, C, to the numbers on the plate A are such that, upon the levers being so depressed, and their corresponding plates raised, only that number on the plate A will be exposed to view which equals the amount of the purchase. This will be understood upon an examination of Figs. 3 and 4, in the first of which all the plates are shown separately, while in Fig. 4 the superposed or overlapping plates are shown as added in succession. As will be seen upon an examination of the lower right-hand-corner diagram none of the numbers are exposed when the plates are in their normal depressed position. It will also be seen that the upper left-hand space on the plate A (over the number 5) is blank, and that the spaces which are opposite the sight-opening 1 on the plate C, on all the other plates are perforated. Now suppose that the plates are in this position and that it be desired to indicate a purchase amounting to five cents. It is only necessary to depress the first of the series of levers or keys O, which results in elevating the plate A and bringing the number 5 opposite the sight-opening 1 and the corresponding openings $a$ in all the plates, where it will be exposed to view, all the other numbers, however, being covered by one or more of the plates. When the plates are in their normal position, the number 10 lies back of the exposing-plates opposite the sight-opening 2 in the plate C, and is hid from view only by the plate B, which is not perforated opposite the opening 2. When, however, the second key of the series, having thereon the number 10, is depressed, the plate B is elevated and the perforation thereon, marked $f$, is brought opposite the opening 2, and the number 10 is exposed. When it is desired to expose the number 25, which normally occupies a position between spaces 3 and 4, the first and third keys or levers, having thereon the numbers 5 and 20, (whose sum is 25,) would have to be depressed. This would result by the depression of the first lever in elevating the plate A, so that the number 25 comes opposite the space 3, and by the depression of the third lever in elevating the plate B′, the only one not perforated opposite the sight-opening 3 when the plates are in normal position, so that the perforation marked $f'$ would come opposite thereto, and thus expose the number.

From these illustrations of the operation of my invention, and from an examination of the drawings, it will be apparent how any number on the plate A may be exposed.

While I have illustrated my invention as embodied in a machine having five finger-keys and designated to indicate purchases from five cents to one dollar and fifty-five cents, it will be apparent that more or less keys might be employed and that the arrangement of the perforations in the exposing-plates might be changed as the number of plates or the arrangement of figures on the plate A would require. An apparatus employing six movable plates could be used to expose sixy-three different numbers or amounts from five cents to three dollars and fifteen cents. One having seven plates would expose one hundred and twenty-seven numbers, and so on.

It will be observed that the plate C is stationary relatively to the plate A, having the numbers thereon, and that the number of horizontal rows of numbers is twice the number of the horizontal rows of sight-openings in the plate C, the numbers ending in 0 being normally opposite the sight-openings and those numbers ending in 5 being brought opposite thereto when the plate A is elevated. The result of course would be the same were the plate A stationary and the plate C shifted, it being only necessary that one of these plates should be held stationary relatively to the other. Combined with the apparatus may be any style of printing, recording, or adding machine.

What I claim is—

1. In a cash-register, the combination of a plate having a series of numbers thereon, another plate having a series of sight-openings, one of these plates being movable relatively to the other, a series of movable perforated exposing-plates, and keys or levers for moving the said plates, substantially as described.

2. In a cash-register, the combination of a plate having thereon a series of numbers, another plate having a series of sight-openings, one of these plates being stationary relatively to the other, the number of rows of numbers being twice the number of the rows of sight-openings, the movable perforated exposing-plates, and the levers for moving the plates, substantially as described.

3. In a cash-register, the combination of a movable plate, A, having thereon a series of figures, a stationary plate, C, in front of the plate A, having a series of sight-openings, the movable perforated exposing-plates arranged between the plates A and C, and the levers for moving the said plates, substantially as described.

4. In a cash-register, the combination of the plate A, having thereon a series of numbers, the movable perforated exposing-plates lying one in front of another in front of the plate A, the operating levers or keys, and the arms connecting the levers or keys and the plates arranged in the same plane, substantially as described.

5. In a cash-register, the combination of a plate bearing a series of numbers, movable perforated exposing-plates, operating-levers for the movable plates, connecting-arms between the movable plates and levers arranged in the same plane, locking projections, as the nuts J, carried by the arms, and a rocking bar arranged to be contacted by the said projections when the levers are moved, substantially as described.

6. In a cash-register, the combination of the plate A, bearing a series of numbers, the movable perforated exposing-plates B, B', B'', and B''', the stationary plate C, having a series of sight-openings, a series of levers or finger-keys, connecting-arms between the levers and plates, the nuts J on the arms, and the rocking bar I in rear of the arms in position to be struck and operated by the said nuts as the levers are operated, substantially as described.

In testimony whereof I affix my signature in presence of two witnesses.

JOHN C. HAZLETT.

Witnesses:
F. G. FISCHER,
A. A. HIGDON.